(No Model.)

E. PITTS.
DRILL.

No. 460,027. Patented Sept. 22, 1891.

WITNESSES:
A. J. Schwartz
C. S. Frye

Ella Pitts
INVENTOR

BY W. J. FitzGerald
ATTORNEYS

UNITED STATES PATENT OFFICE.

ELLA PITTS, OF PALMER, KANSAS.

DRILL.

SPECIFICATION forming part of Letters Patent No. 460,027, dated September 22, 1891.

Application filed January 23, 1891. Serial No. 378,848. (No model.)

*To all whom it may concern:*

Be it known that I, ELLA PITTS, a citizen of the United States, residing at Palmer, in the county of Washington and State of Kansas, have invented certain new and useful Improvements in Drills; and I do hereby declare the following to be a full, clear, and exact description of the invention, such as will enable others skilled in the art to which it appertains to make and use the same.

My invention relates to improvements in grain-drills; and it consists of certain novel features of construction and arrangement, hereinafter described and claimed.

Figure 1:
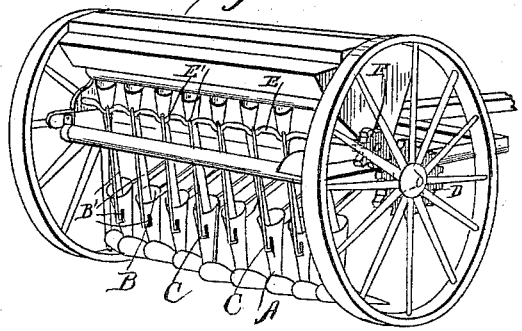
Figure 2:
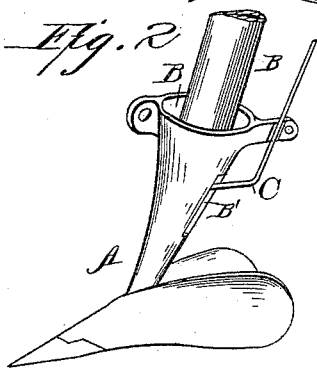
Figure 3:
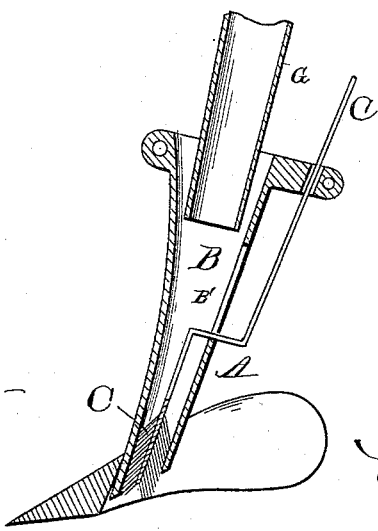

Referring to the accompanying drawings, Figure 1 is a perspective of my improvements in drills as applied to use. Fig. 2 is an enlarged view of one of the drill-points. Fig. 3 is a perpendicular section of Fig. 2.

Referring in detail to the various parts of my invention by their respective letters of designation, A represents one of the drill-points or lister-blades, which may be increased in number as desired. The drill-points are attached in the usual manner to a drill of any preferred make or construction, and are so arranged and connected that they will all be pressed deeply into the soil, so that the seed will be insured sufficient moisture during the time of drought and in the lightest and most porous soils. Each of the drill-points is provided from top to bottom with an opening or throat B, which is adapted to receive the grain from the chest above and convey it to the seed-bed at the bottom of the drill-point. I prefer to construct these drill-points in the manner of the common "lister-plow"—that is to say, with a mold-board upon each side—so that the soil will be thrown upon either side of the point and a furrow opened as a seed-bed. The several furrows thus made will become filled by the action of the weather before harvest-time, or they may be filled at once by a harrow or other suitable drag. On the hub of one of the wheels is mounted a cog-wheel D.

To the rear of the seed-box is mounted the transverse crank-shaft E, having a pinion F secured on its end, which meshes with the cog-wheel D. This shaft is formed with a series of cranks E', on which are pivotally mounted the upper ends of the series of plunger-rods C. The several plunger-rods extend down just to the rear of the throats B of the drill-points, and then bend forward at a sharp angle to pass through the longitudinal slots B' in the back of the several throats or tubes, their lower ends then passing down in a line parallel with the upper main part of the several plunger-rods. It will now be seen that as the machine is driven forward the cog-wheel D, turning with the drive-wheel to which it is secured, will revolve the crank-shaft E through its end pinion F, and the series of plunger-rods C will be thus continuously reciprocated by the revolving crank-shaft. The seed is conveyed by the rubber tubes G from the grain-chest to the upper part of the shoes or throats B, and it is caused to pass freely through the same down into the furrow by the reciprocation of the plunger-rod C in the throats or openings of the drill-points or listers. By thus placing the seed deeply in the soil it will be sure to germinate, and will also place the root of the plant sufficiently deep to insure it against the effects of dry weather.

It will be seen that I have provided a simple, cheap, and efficient means to prevent clogging of the throat of the drill-point or lister and for insuring that the seed will be deeply planted without the necessity of using the usual expensive press-drill. It will also be seen that I use the drill of ordinary construction by making only a few slight changes. My improved drill can therefore be cheaply made and used, I claim, with better results.

By using my improved drill it will not be necessary to first plow the soil, as is now common, but the drill provided with my attachments may be at once drawn over the ground, and each lister or drill-point will open its own furrow or seed-bed without a previous loosening or plowing of the soil.

It will be readily understood that a great saving of labor is thus effected. Believing that the advantages, operation, and construction of my improvements in drills will be readily understood from the foregoing description, taken in connection with the accompanying drawings, further reference thereto is deemed unnecessary.

Having thus described my invention, what I claim as new, and desire to secure by Letters Patent, is—

The herein-described drill, having the series of drill-points or small listers adapted to press deeply into the soil and having their throats B formed with the longitudinal slots B' near their lower ends, the series of vertically-reciprocating plunger-rods C, passing down outside of the throats B and having the bent lower ends adapted to pass through the slots B' and reciprocating within the slotted throats B, and means for reciprocating the said plunger-rods, substantially as set forth.

In testimony whereof I affix my signature in presence of two witnesses.

ELLA PITTS.

Witnesses:
A. H. PICKARD,
W. S. LOWER.